United States Patent [19]

Westlund, Jr. et al.

[11] Patent Number: 4,985,656

[45] Date of Patent: Jan. 15, 1991

[54] LAMP WITH RE-ENFORCED TUBULAR BASE PINS

[75] Inventors: Arnold Westlund, Jr., Winchester; Jeffrey P. Buschmann, Lexington, both of Ky.

[73] Assignee: GTE Products Corporation, Danvers, Mass.

[21] Appl. No.: 402,394

[22] Filed: Sep. 5, 1989

[51] Int. Cl.[5] .......................... H01J 5/48; H01J 5/50; C04B 7/00

[52] U.S. Cl. .................................. 313/318; 313/332; 439/935; 106/690

[58] Field of Search ................ 313/318, 332; 439/232, 439/935, 936; 174/50.52; 106/85

[56] References Cited

U.S. PATENT DOCUMENTS 4,436,555 3/1984 Sugama et al. ...................... 106/85

4,492,814 1/1985 Snell et al. ...................... 313/332 X 4,758,760 7/1988 Cox et al. ...................... 313/318 X 4,785,218 11/1988 Kohl et al. ...................... 313/318 X

*Primary Examiner*—Sandra L. O'Shea

*Attorney, Agent, or Firm*—William E. Meyer

[57] ABSTRACT

A lamp with re-enforced tubular base pins is disclosed. A less expensive, high quality, high wattage lamp may be formed with re-enforced tubular base pins. The lamp comprises a lamp envelope having an enclosed means for producing light, a light transmissive envelope, and at least two electrical connections, a ceramic lamp base for holding the lamp envelope, and the two tubular pins. Each pin comprises an electrically conductive tube having an exterior surface along which a compressive coupling may be made, and an interior surface defining an internal volume. A fill cement is positioned in the internal volume of each base pin at least along the portions opposite where compressive coupling may be made to the exterior surface of the pin.

17 Claims, 2 Drawing Sheets

LAMP WITH RE-ENFORCED TUBULAR BASE PINS

1. TECHNICAL FIELD

The invention relates to electric lamps and particularly to high wattage electric lamps. More particularly the invention is concerned with high wattage bi-post pin electric lamps.

2. BACKGROUND ART

High wattage lamps are used in television and movie studios to light large areas with high quality white light. These lamps typically range from 500 to 10,000 watts, and commonly have the general form of an incandescent source captured in a single ended press seal tube. A ceramic base holds the tube, and two pins that are used for the electrical connection. High wattage lamps run very hot, so a base with a high thermal resistance is needed. The bases are therefore commonly formed from a molded ceramic. The lamps also have very high power inputs, and so require oversized electrical connectors. For example, a 10,000 watt DTY studio lamp may carry as much as 88 amperes. The common electrical connectors are a pair of pins in the form of short, thick, parallel shafts. These pins may be a centimeter or greater in diameter, three centimeters or more long, and separated center to center by four or more centimeters. When positioned in a base the pins may be bolted in place by clamps that tightly bind the base connector to the pin shafts. Bolting the lamp in place assures a solid electrical connection. In actual practice lamps are repeatedly checked, adjusted or moved from site to site during or between filming sessions. The lamp pins are then repeatedly clamped and unclamped in place. In summary, the pins are necessarily sturdy shafts to endure the heat, electrical and mechanical forces placed on them. The lamp pins are commonly machined from solid stock, but machined pins are both heavy, and expensive. There is then a need for a less expensive and lighter weight pin.

Extruded hollow pins have been used, but have been found at times to cause arcing between the pin and base connector in the confines of the base. The hollow pins are at times heated, burned, pitted, or partially melted by the arcing currents. The arcing may cause the lamps to fail prematurely, and naturally causes safety concerns in the user. There is then a need for a pin that does not cause base arcing, and the associated pin destruction.

Examples of the prior art are shown in U.S. Pat. Nos, 4,084,112; 4,492,814; 4,499,404; 4,758,760; 4,766,347; and 4,785,218.

U.S. Pat. No. 4,084,112 Herbert et al. shows a pin lamp having hollow lamp pins. The hollow pins are flattened at the internal ends to allow a welded contact to be made with the lamp connection, and to position the pins in the ceramic base.

U.S. Pat. No. 4,492,814 Snell et. al shows a press sealed lamp having a cavity formed around the lamp connection on the exterior side of the sealing foil. The cavity is then filled with a solder glass to prevent oxidation of the lamp lead, and the foil seal.

U.S. Pat. No. 4,499,404 Walsh shows a pin lamp having a two piece ceramic base. The lamp is cemented in the upper portion of the ceramic base, and the lamp connections are extended down to metal pins captured in the lower portion of the ceramic base. While there is no discussion of the pin structure, the lamp shown is thought to be an example of studio lamps with machined pins.

U.S. Pat. No. 4,758,760 Cox et al shows a ceramic base with a main cavity to hold a lamp, ventilated connection passages that enclose the lamp seal legs, and pin cavities that position and hold two pins for electrical connection. U.S. Pat. No. 4,758,760 shows substantially the preferred embodiment of the remaining lamp and base portions as used by the applicants. A different lamp leg structure is shown in U.S. Pat. No. 4,758,760 than is preferred by the applicants here. U.S. Pat. No. 4,758,760 is therefore incorporated by reference for purposes of generally instructing the structure of the lamp and lamp base.

U.S. Pat. No. 4,766,347 Janssen et. al shows a high pressure discharge lamp wherein a glass material is melted around the lamp connection to seal the connection to an adjacent mounting element.

U.S. Pat. No. 4,785,218 Kohl et al. shows a pin lamp with hollow lamp pins. The lamp connections are threaded through the hollow lamp pins, and then solder is used to fill the remaining volume of the lamp pin cavity. The solder completes the connection between the lamp connections and the base pins. While solder may be used to fill the cavity of a small pin, the solder being mostly lead would excessively weight a large lamp. Furthermore, solder is neither mechanically strong, or resistant to high heat or electric currents. A solder plug in a high wattage lamp might melt, sag, or otherwise fail under the mechanical or heat load.

DISCLOSURE OF THE INVENTION

The a high wattage electric lamp with base pins compressively coupled to for electrical connection may be improved by using an electrically conductive tube having an exterior surface along which the compressive coupling may be made, and an interior surface defining an internal volume, and a tube strengthening cement positioned in the internal volume at least along the portions opposite where the compressive coupling may be made to the exterior surface of the tube to strengthen the tube

BEST MODE FOR CARRYING OUT THE INVENTION

The applicants have found the arcing in hollow pins in high wattage lamps is not the result of moisture, contaminants, or poor shaping of the original extruded pins. Nor is the arcing thought to be the result of eddy currents, or capacitance of the hollow pins. Applicants have determined that the arcing, and associated erosion of the pins is the result of excessive coupling forces placed on the pin. The excessive coupling forces cause the pin to warp, bend, collapse, or otherwise become misshapen. The subsequent high heating that occurs during lamp operation further exacerbates the pin distortion. While the pin may on casual viewing appear to be undistorted or at most only slightly altered, the results of a slight distortion are nonetheless small air gaps formed between the base clamps, and the pin. The area of actual electrical contact is then reduced, resulting in local areas of good contact and high conduction, and adjacent areas of poor contact and reduced, or no conduction. The pin is then over heated in some areas, locally reducing conduction. Arcing then occurs as heat builds up in one area reducing the local conductivity. The arcing causes further variations in heating and conduction.

Applicants have found that an inexpensive extruded hollow pin can be made to preserve its shape under high mechanical and high heat forces and thereby not cause destructive arching in use. The applicants have found that by filling an inexpensive hollow pin with a ceramic cement, the filled, extruded pin is sufficiently strengthened to resist distortions that otherwise occur in clamping a hollow pin in a base. The inexpensive, cement filled pin then performs substantially the same as an expensive machined pin.

Figure 1:
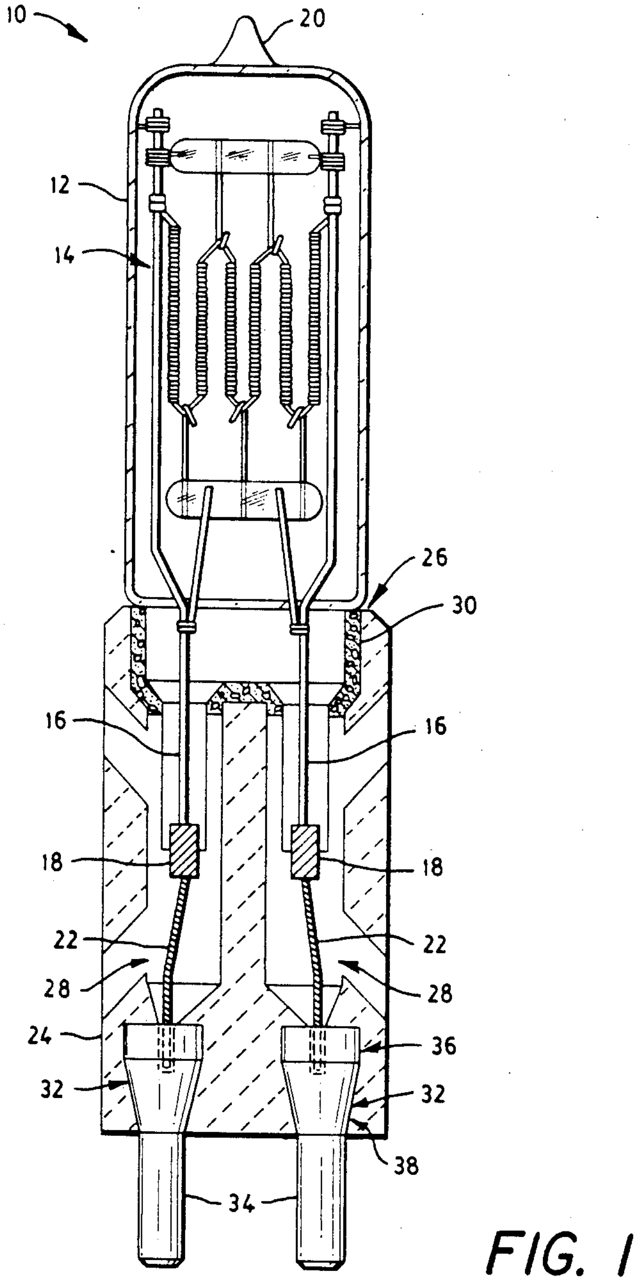
FIG. 1 shows a view of a partially disassembled preferred embodiment of a lamp with re-enforced tubular base pins.

FIG. 1 shows a preferred embodiment of a lamp 10 with re-enforced tubular base pins. One of two generally symmetric base pieces has been removed to expose the internal structures. The lamp 10 with re-enforced tubular base pins includes a lamp envelope 12 held in a ceramic lamp base 24. The lamp envelope 12 is then electrically coupled to two generally tubular lamp pins 34 that are re-enforced with cement 48 to withstand bolting or similar firm electrical connection forces between the pins 34 and a lamp socket (not shown).

The lamp 10 has a light transmissive envelope 12 enclosing a light producing means 14, and at least two electrical connections 16. By way of example, a lamp envelope 12 is shown as a glass tube with two molybdenum cup type lamp connections 16 sealed 18 at one end and tipped off at the opposite end 20. Extending from the connections 16 are lamp leads 22 for electrical connection. While the lamp 10 shown is an incandescent lamp, the improved pins 34 described herein may be equivalently used with an arc discharge, or similar high wattage light source.

The seals 18 and leads 22 may be held in ceramic lamp base 24 by means a complementary formed main cavity 26. The lamp base 24 may further include connection passages 28 for the necessary electrical connection. An example is to couple the connections 16 to the leads 22 which then extend through connection passages 28 for connection to the pins 34. The envelope 12 may be held in stable relation to the base 24 by filling the main cavity 26, or connection passages 28 with a lamp cement 30 as is known in the art. The preferred base 24 has a two piece construction with a molded main cavity 26 at one end to receive a portion of the lamp envelope 12, such as the seals 18, and the lamp leads 22. The lamp 10 is held in the main cavity 26 by a lamp cement 30. The preferred connection passages 28 are ventilated as described in U.S. Pat. No. 4,758,760 Cox et al.

The lamp base 24 further includes pin retention cavities 32 to position and retain each respective lamp pin 34. The preferred retention cavity 32 is complementary with a respective end of a pin 34, thereby allowing a tight positioning of the inserted pin 34. The retention cavities 32 may each receive a first end of a respective pin 34 while the opposite end of the respective Pin 34 protrudes outwardly for electrical connection. The preferred retention cavities 32 have a rectangular portion 36 opening to a funnel section 38 whose narrow end faces outward.

Figure 2:
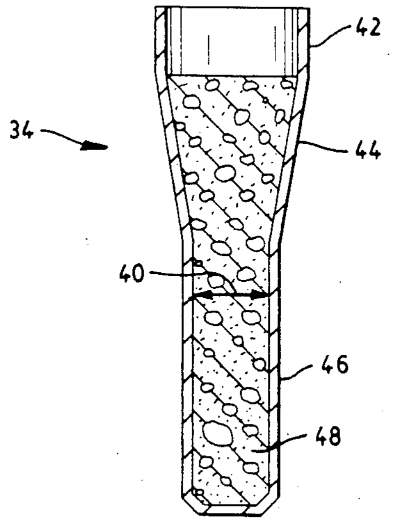
FIG. 2 shows a cross sectional view of a preferred embodiment of a hollow lamp pin filled with cement.

FIG. 2 shows a cross sectional view of a preferred embodiment of a hollow lamp pin filled with cement. Each pin 34 may be economically formed as an electrically conductive hollow tube. Each pin 34 then includes a formed pin cavity 40. Each pin may further include coupling means to assist in electrically, and mechanically joining the leads 22 to the pins 34. Each pin may also include means to position the base 24 and pin 34 in a fixed, or limited motion arrangement. In particular, the preferred pins 34 are extruded metal tubes with means for electrically being coupled to the lamp leads 22, and means for being securely positioned in the retention cavities 32. In the preferred embodiment, the outward ends of leads 22 are inserted in flatten ends 42 of the respective tubes 34 where an opening has been left to receive the lamp lead 22. The leads are then silver soldered in place. Alternatively, the lamp leads 22 may be welded to the pin 34. The pins 34 may also be crimped or swaged to capture the inserted lamp leads 22. Crimping or swaging the pin ends forms an expanded diametric portion, like a lip that may then be used to locate the pins 34 with respect to the base 24. In the preferred embodiment, the electrical connection between the lamp leads 22 and the pins 34 is made before the pins 34 are positioned in the base 24.

The flattened ends 42 of the tubes form roughly rectangular sections. The rectangular portion 36 of the retention cavity is complementary with each flattened end 42. Each rectangular portion 36 then snugly captures a flattened end 42 of a respective pin 34 to resist rotation. In the preferred embodiment, the pins 34, in the area adjacent the flattened ends 42, have funnel shaped sections 44 with the narrow ends facing outwards. The retention cavity funnel sections 38 are complementary with the pin funnel sections 44, thereby resisting withdrawal of the pins 34. The narrow ends of the pin funnels 44 extend to tubular portion 46 that extend outwards from the base for electrical connection. The outward most ends of the pins 34 are rounded off for easy insertion in a socket. Similar, matings between a retention cavity 32 and a pin 34 may be made to lock each pin in position in a base.

Figure 3:
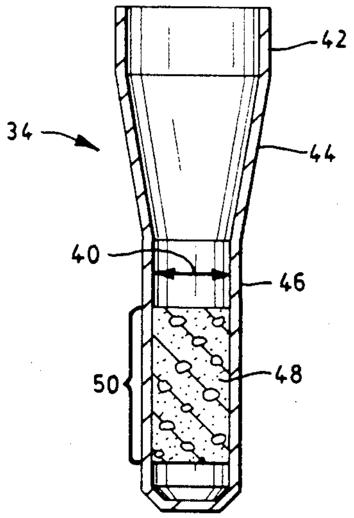
FIG. 3 shows a cross sectional view of a preferred embodiment of a hollow lamp pin partially filled with cement.

Once the electrical connections are made between the lamp leads 22 and the pins 34, the pin cavities 40 are filled, or at least the portions of the pin cavities 40 where clamping connections may be made, are filled with a substantially rigid cement 48. All of the pin cavity 40 may be filled with the cement 48, thereby assuring that no extraneous materials may be enclosed or built up in any remaining open cavities. Alternatively, only a portion of the pin cavity 40 may be filled, for example only portion of the pin cavity 40 protruding from the base, and in the area 50 where a clamping connection might be made. Partially filling the base pin cavity reduces the overall weight of the lamp, and may allow faster and sounder curing of the cement 48 and lamp structure. Similarly, ventilating, or weight reducing passages may be included in the cement filling the tube cavities, provided the tube strength is not weakened. FIG. 3 shows a cross sectional view of a preferred embodiment of a hollow lamp pin partially filled with cement 48. Applicants prefer the entire volume of the pin cavity 40 be filled with the cement 48. In either case, the cement 48 should at least substantially fill the internal cavity volumes adjacent the external areas subjected to clamping, and should be sufficiently rigid to re-enforce the pin during clamping. The exterior surfaces of the pins 34 are then re-enforced by the hardened cement 48 in the protruding areas of the pins 34 where clamping might bend, crush or warp the exposed pins, and thereby resist destructive arcing.

The cement 48 may be any one of a number of cements used in lamp positioning that harden to from a hard concrete like material. The preferred cement 48 is dense and not porous, thereby being more highly resistant to crushing or flaking. The preferred cement 48 also has good high temperature stability, and low thermal conductivity. The preferred cement 48 also has a thermal expansion that is compatible with, and preferably matched to the pin. The applicants have found a ceramic type cement, such as a magnesium phosphate cement cured in place in an air oven works well with extruded, swaged nickle coated brass tube pins.

In a working example some of the dimensions were approximately as follows: The pins were nickle coated brass tubes, with a swaged funnel section facing the tubular portion. The broad end of the funnel section was flattened around a small mandrel to leave a tubular inset. The lamp leads were inserted in the insets and silver soldered in place. The pins had a length of 5.25 cm, a diameter of 1.1 cm and a wall thickness of 0.6 cm. The pin cavity was filled with a magnesium phosphate cement. Any excess cement was removed from the pin opening at the base of the pin. The cement was then cured for 20 minutes in an air oven at 80° Celsius. Care was taken that the oven temperature did not rise excessively causing the water in the cement to boil. The physical specifications of the cement used were as follows, the color was white, the compressive strength was (ASTM C-109) from 4500 to 5500 psi. The modulus of rupture was (ASTM C-580) 580 psi. The tensile strength was (ASTM C-190) 240 psi. The dielectric strength was (ASTM D-149) 25.0 to 38.0 volts/MIL at 750° F. The volume resistivity was (ASTM D-1829) $10^9$ to $10^{10}$ Ohm-Cm at 750° F. The thermal conductivity (K factor) was 10 to 12 BTU/hr/ft$^2$/degrees F/in. The coefficient of thermal expansion was $2.6 \times 10^{-6}$ in/in/-degrees F. With the above working example, the pins were inserted and bolted in place in a standard lamp socket and operated under normal conditions. No arcing, no burning, no pitting, and no other erosion of the pins was observed. The disclosed dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A re-enforced tubular base pin as used in an electric lamp for compressive coupling to an electrical source, the pin comprising: an electrically conductive tube having an exterior surface along which a compressive electrical coupling may be made, and an interior surface defining an internal volume, and a substantially rigid cement positioned in the internal volume to substantially fill the volume at least along the portions opposite where compressive coupling may be made to the exterior surface of the tube.

2. The pin in claim 1, wherein the cement fills the internal volume.

3. The pin in claim 1, wherein the cement is a substantially electrically nonconductive cement.

4. The pin in claim 1, wherein the cement is a substantially thermally nonconductive cement.

5. The pin in claim 1, wherein the cement is a substantially thermally nonexpansive cement.

6. The pin in claim 1, wherein the cement is a substantially mechanically noncompressive cement.

7. The pin in claim 1, wherein the cement is a ceramic type cement.

8. The pin in claim 1, wherein the cement is substantially a magnesium phosphate cement.

9. A lamp with re-enforced tubular base pins comprising:

(a) a lamp envelope having an enclosed means for producing light, a light transmissive envelope, and at least two electrical connections, (b) a ceramic lamp base, having a means for holding the lamp envelope, a means for holding the lamp pins, and a channel for an electrical connection between the lamp envelope connections and the lamp pins, (c) at least two tubular base pins, each pin comprising an electrically conductive tube having an exterior surface along which a compressive coupling may be made, and an interior surface defining an internal volume, each pin being electrically connected to a respective lamp connection, and (d) a fill cement positioned in the internal volume of each base pin at least along the portions opposite where compressive coupling may be made to the exterior surface of the base pin protruding from the ceramic base.

10. The lamp in claim 9, wherein the cement fills the internal volume.

11. The lamp in claim 9, wherein the cement is a substantially electrically nonconductive cement.

12. The lamp in claim 9, wherein the cement is a substantially thermally nonconductive cement.

13. The lamp in claim 9, wherein the cement is a substantially thermally nonexpansive cement.

14. The lamp in claim 9, wherein the cement is a substantially mechanically noncompressive cement.

15. The pin in claim 1, wherein the cement is a ceramic type cement.

16. The lamp in claim 9, wherein the cement is substantially a magnesium phosphate cement.

17. The lamp in claim 9, wherein the base includes a formed portion of the surface of the pin retaining cavity, and the pin has a corresponding complementary portion to couple one to the other in registration.

* * * * *